United States Patent
Satou et al.

(10) Patent No.: US 10,151,015 B2
(45) Date of Patent: Dec. 11, 2018

(54) METHOD FOR LEACHING PRECIOUS METAL CONTAINED IN DECOPPERIZED ANODE SLIME

(71) Applicant: MITSUBISHI MATERIALS CORPORATION, Tokyo (JP)

(72) Inventors: Ryousuke Satou, Iwaki (JP); Takahiro Uno, Iwaki (JP); Satoshi Okada, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/536,280

(22) PCT Filed: Dec. 24, 2015

(86) PCT No.: PCT/JP2015/086007
§ 371 (c)(1),
(2) Date: Jun. 15, 2017

(87) PCT Pub. No.: WO2016/104594
PCT Pub. Date: Jun. 30, 2016

(65) Prior Publication Data
US 2017/0327927 A1    Nov. 16, 2017

(30) Foreign Application Priority Data
Dec. 25, 2014   (JP) .................. 2014-262908

(51) Int. Cl.
*C22B 3/00* (2006.01)
*C22B 3/10* (2006.01)
*C22B 7/00* (2006.01)
*C25C 1/12* (2006.01)

(52) U.S. Cl.
CPC .............. *C22B 11/042* (2013.01); *C22B 3/10* (2013.01); *C22B 7/007* (2013.01); *C25C 1/12* (2013.01)

(58) Field of Classification Search
CPC ......... C22B 11/042; C22B 3/10; C22B 7/007; C25C 1/12
See application file for complete search history.

(56) References Cited

U.S. PATENT DOCUMENTS 5,749,940 A     5/1998  Narita
2010/0116091 A1 5/2010  Gallegos

FOREIGN PATENT DOCUMENTS

| CN | 85106670 A | 3/1987 |
| CN | 103205576 A | 7/2013 |
| JP | 2001-207223 | 7/2001 |

(Continued)

OTHER PUBLICATIONS

Office Action dated Jul. 13, 2017, issued for the Korean patent application No. 10-2017-7015778 and English translation thereof.
(Continued)

*Primary Examiner* — Jenny R Wu
(74) *Attorney, Agent, or Firm* — Locke Lord LLP

(57) ABSTRACT

A method of leaching a precious metal contained in decopperized anode slime includes, agitating and circulating a slurry at the same time, in carrying out hydrochloric acid oxidation leaching of the precious metal contained in the decopperized anode slime by adding a hydrochloric acid and an oxidant to the slurry of the decopperized anode slime, wherein in the circulating, the slurry is extracted from a lower portion of a tank and supplied again into an upper portion of the tank.

5 Claims, 1 Drawing Sheet

(56) References Cited

FOREIGN PATENT DOCUMENTS

| JP | 2007-277591 | 10/2007 |
| JP | 2009-102724 | 5/2009 |
| JP | 4900322 B | 3/2012 |
| JP | 2012-126952 A | 7/2012 |
| JP | 2012-246198 A | 12/2012 |
| WO | 2009/105832 A1 | 9/2009 |
| WO | 2015/121799 A1 | 8/2015 |

OTHER PUBLICATIONS

Akinori Toraiwa et al., "Development of Hydrometallurgical Process of Copper Anode Slimes in Nippon Mining & Metals," Shigen-to-Sozai, vol. 116, 2000, pp. 484-492 and partial translation thereof.
International Search Report dated Apr. 5, 2016, issued for PCT/JP2015/086007 and English translation thereof.
J. Hait et al., "Processing of copper electrorefining anode slime: a review", Transactions—Institution of Mining and Metallurgy. Section C.Mineral Processing and Extractive Metall., London, GB, vol. 118, No. 4, Dec. 1, 2009, pp. 240-252. (cited in the Apr. 30, 2018 Search Report issued for EP15873162.0).
Search Report dated Apr. 30, 2018, issued for the European patent application No. 15873162.0.
Office Action dated Sep. 28, 2018, issued for 201580070216.8 and English translation thereof.

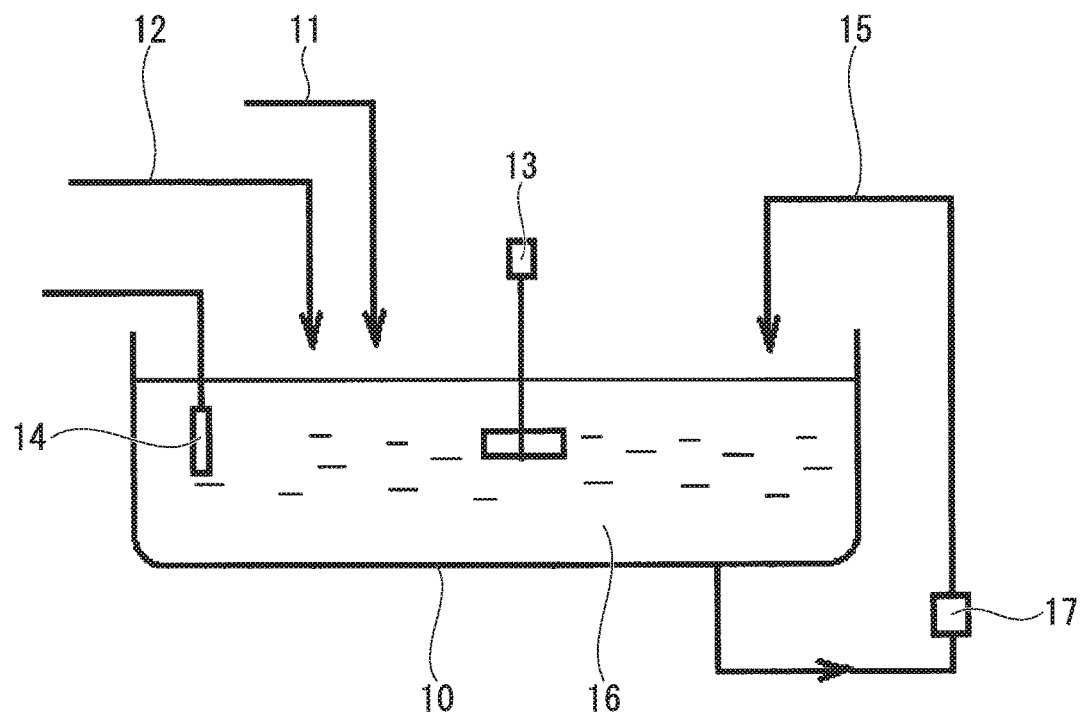

METHOD FOR LEACHING PRECIOUS METAL CONTAINED IN DECOPPERIZED ANODE SLIME

TECHNICAL FIELD

The present invention relates to a leaching method for improving a leaching rate of a precious metal in a method of carrying out hydrochloric acid oxidation leaching of the precious metal contained in decopperized anode slime.

Priority is claimed on Japanese Patent Application No. 2014-262908, filed on Dec. 25, 2014, the content of which is incorporated herein by reference.

BACKGROUND ART

Since decopperized anode slime generated by copper electrolysis contains large amounts of precious metals such as gold, platinum, silver, selenium, palladium, and tellurium, these precious metals are recovered from the decopperized anode slime. For example, decopperized anode slime is subjected to oxidation roasting to convert selenium into selenium dioxide and vaporize the selenium dioxide, and the selenium dioxide is cooled and condensed to recover the selenium. In addition, the remaining matter of the oxidation roasting is melted and impurities therein are removed to produce a raw silver plate. The raw silver plate is set as an anode to electrolytically recover silver. The electrolytic slime after recovering silver by electrolysis is further subjected to parting (leaching using nitric acid) to recover platinum and palladium from the liquid. A raw gold plate is produced from the dissolution residues after the parting and is set as an anode to recover gold by electrolysis. Such a processing method has been known.

As another method of recovering precious metals from decopperized anode slime, a processing method (Hoffmann process) including recovering silver chloride by carrying out chlorination leaching of decopperized anode slime, extracting gold with a solvent from the liquid after the leaching, recovering selenium by reduction and distillation from the liquid after the extraction, and recovering gold and platinum from the liquid after the distillation has been known.

In the chlorination leaching step, the decopperized anode slime is repulped with a hydrochloric acid and an oxidant is added thereto to perform oxidation leaching. Due to this chlorination leaching, silver is converted into silver chloride, and gold, platinum, and palladium are also dissolved in the hydrochloric acid liquid. A hydrogen peroxide or a chlorine gas is used as the oxidant (Non-Patent Document 1).

Regarding the chlorination leaching, a processing method has been known in which copper removal electrolytic slime is made into a slurry with water, and in oxidation leaching by injection of a chlorine gas, the concentration of chloride in the leaching solution is controlled to a certain amount or less to improve a leaching rate of gold, silver, and the like (Patent Document 1).

CITATION LIST

Patent Document

[Patent Document 1] Japanese Unexamined Patent Application, First Publication No. 2001-207223

Non-Patent Literature

[Non-Patent Document 1] "Development of Hydrometallurgical Process of Copper Anode Slimes" Shigen-to-Sozai, vol. 116, p. 484 to 492 (2000)

DISCLOSURE OF INVENTION

Technical Problem

In the step of carrying out chlorination leaching of a slurry of decopperized anode slime, the leaching rate of gold may be low, i.e., 90% or less. The reason for this is thought to be that the oxidation-reduction potential of the slurry is low, and thus during the chlorination leaching, unreacted silver selenide, selenium, and the like in the slime act as a reducing agent with respect to gold, dissolved gold is reduced, precipitated, and incorporated into silver chloride and lead chloride as main components of the leaching residues, contact between the gold and the leaching solution is disturbed, and thus the leaching rate is reduced.

As a countermeasure therefor, the chlorination leaching was performed with an increased oxidation-reduction potential of the slurry, but the leaching rate of gold did not reach 90%.

In addition, it was not possible to increase the leaching rate of gold to 90% or greater even in a case of increasing the number of rotations of a device for agitating the slurry. The decopperized anode slime has a higher density than the leaching solution and is thus easy to precipitate in the leaching solution. Thus, a slime-concentrated portion (pile of slime) is easily generated in a lower portion of a tank. Therefore, it was thought that even if the rotational speed of the device for agitating the slurry is simply increased, the slime-concentrated portion is not sufficiently eliminated, and thus the leaching rate of gold is not improved.

The invention is intended to solve the problem in chlorination leaching in the related art, and based on an idea that a pile of slime is prevented from being formed in the lower portion of the tank by performing slurry circulation in which a slurry is extracted from a lower portion of a tank and supplied again to an upper portion of the tank, a leaching method of the present invention has been achieved in which the slurry circulation is performed in combination with slurry agitation to promote contact between gold and a leaching solution to thus increase a leaching rate.

Solution to Problem

The present invention relates to a leaching method including the following configuration.

[1] A method of carrying out hydrochloric acid oxidation leaching of a precious metal contained in decopperized anode slime, includes: adding a hydrochloric acid and an oxidant to a slurry of the decopperized anode slime, agitating and circulating the slurry at the same time, wherein in the circulating, the slurry is extracted from a lower portion of a tank and supplied again into an upper portion of the tank, and wherein the slurry is circulated in a case where an oxidation-reduction potential of the slurry is 650 mV to 950 mV.

[3] The method of carrying out hydrochloric acid oxidation leaching of a precious metal contained in decopperized anode slime according to [1], wherein the oxidant is added by a fixed amount each time to the slurry of decopperized anode slime in the presence of a hydrochloric acid, such that the circulating is started when the oxidation-reduction potential of the slurry is higher than 650 mV, and the circulating is terminated when the oxidation-reduction potential of the slurry reaches 950 mV.

[4] The method of carrying out hydrochloric acid oxidation leaching of a precious metal contained in decopperized anode slime according to [1] or [3], wherein 1 to 10 mass % of the slurry with respect to a total amount is extracted per hour to circulate the slurry.

[5] The method of carrying out hydrochloric acid oxidation leaching of a precious metal contained in decopperized anode slime according to any one of [1], and [3] to [4], wherein the hydrochloric acid oxidation leaching is performed in a case where a solid component concentration is 350 to 500 g/L and a chlorine concentration is 2 to 4 mol/L in the slurry.

[6] The method of carrying out hydrochloric acid oxidation leaching of a precious metal contained in decopperized anode slime according to any one of [1], and [3] to [5], wherein the hydrochloric acid oxidation leaching is performed at a liquid temperature of 70° C. to 80° C.

Advantageous Effects of Invention

According to a leaching method of the present invention, a leaching rate of precious metals such as gold is improved. Specifically, a leaching rate of precious metals is improved as compared with a case in which precious metals are leached only by slurry agitation in a state in which a pile of slime is generated.

BRIEF DESCRIPTION OF DRAWINGS

FIG. 1 is a schematic diagram of a leaching method of the present invention.

BEST MODE FOR CARRYING OUT THE INVENTION

Hereinafter, an embodiment of a method of leaching precious metals contained in decopperized anode slime according to the present invention will be described.

This embodiment relates to a method of carrying out hydrochloric acid oxidation leaching of precious metals contained in decopperized anode slime by adding a hydrochloric acid and an oxidant to a slurry of the decopperized anode slime. The method includes: agitating and circulating the slurry at the same time, wherein in the circulating, the slurry is extracted from a lower portion of a tank and supplied again into an upper portion of the tank. Regarding the lower portion of the tank from which the slurry is extracted, the slurry may be extracted from a tank bottom. Specifically, a discharge port capable of adjusting a flow rate is provided in the tank bottom, and the slurry is discharged from the discharge port.

FIG. 1 illustrates a schematic diagram of the leaching method according to this embodiment. As illustrated in the drawing, a leaching tank 10 is provided in which a slurry 16 of decopperized anode slime which is generated by copper electrolysis is formed. A supply tube 11 which supplies decopperized anode slime, a hydrochloric acid, and water is connected to the leaching tank 10, and addition device 12 for adding an oxidant little by little is provided. The leaching tank 10 is also provided with agitation device 13 and an electrometer 14. The leaching tank 10 is further provided with a circulation path 15 from a tank bottom to an upper portion of the tank. The circulation path 15 is provided with a liquid feeding pump 17.

Decopperized anode slime, a hydrochloric acid, and water are supplied to the leaching tank 10 through the supply tube 11 to form a slurry 16. The solid component concentration (slurry concentration) of the slurry is preferably 350 to 500 g/L, and the chlorine concentration of the slurry is preferably 2 to 4 mol/L.

In a case where the slurry concentration is lower than 350 g/L, a long period of time is required for leaching of precious metals, and in a case where the slurry concentration is higher than 500 g/L, the slurry is not easily fed and residues are easily generated. In a case where the chlorine concentration of the slurry is lower than 2 mol/L, precious metals do not sufficiently leach, and in a case where the chlorine concentration of the slurry is higher than 4 mol/L, a burden of chlorine removal of the liquid after leaching of precious metals increases.

The slurry concentration is more preferably 400 to 500 g/L, and even more preferably 450 to 500 g/L. The chlorine concentration of the slurry is more preferably 2.5 to 4 mol/L, and even more preferably 3 to 3.5 mol/L.

The slurry concentration is a value which is adjusted by a ratio of the decopperized anode slime to the hydrochloric acid, the water, and the oxidant. The chlorine concentration is a concentration of free chlorine in the slurry, and is adjusted by calculation from the amount of the reaction material in the raw materials.

The addition device 12 adds an oxidant to the slurry 16 little by little and oxidation leaching proceeds. Examples of the oxidant include chlorine, hydrogen peroxide, sodium permanganate, and potassium dichromate. Among these, a hydrogen peroxide and the like can be used as a preferable oxidant. For example, in oxidation leaching using a hydrogen peroxide, gold contained in a slurry forms a chloroauric acid as shown in the following formula to be dissolved in the liquid.

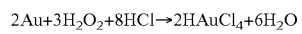

$$2Au+3H_2O_2+8HCl \rightarrow 2HAuCl_4+6H_2O$$

The amount of the oxidant to be added may be adjusted in response to a change of an oxidation-reduction potential.

During the oxidation leaching, the slurry 16 is agitated by the agitation device 13 and an oxidation-reduction potential (ORP) of the slurry 16 is measured by the electrometer 14 in response to the amount of the oxidant to be added.

The position where the electrometer 14 is installed may be disposed anywhere in the leaching tank 10, and is preferably at a height of a central portion in the tank. An oxidation-reduction potential in a state in which the slurry is homogenized can be reflected at the height of the central portion in the tank.

As the electrometer 14 which measures the oxidation-reduction potential of the slurry 16, an electrode meter using an Ag/AgCl electrode can be used to continuously measure the oxidation-reduction potential in the leaching tank 10.

In the leaching method according to this embodiment, with the agitation of the slurry, slurry circulation in which the slurry is extracted from the tank bottom, sent to the upper portion of the tank through the circulation path 15, and supplied again into the tank from the upper portion of the tank is performed. In a leaching method in the related art, gold which has been temporarily reduced and precipitated is incorporated into a pile of slime at the tank bottom and leaching is thus disturbed. In the leaching method according to this embodiment, the slurry is extracted from the tank bottom to prevent a pile of slime from being formed. The extracted slurry is supplied again into the tank from the upper portion of the tank and agitated, and thus aggregating portions contained in the slurry are deagglomerated and gold and the like incorporated into the aggregating portions are exposed to promote oxidation leaching. Furthermore, in the leaching method according to this embodiment, unreacted metals contained in a pile of slime, for example, selenium and the like acting as a reducing agent with respect to gold, are dispersed in the liquid and dissolved. Accordingly, the gold temporarily reduced and precipitated is re-dissolved.

In a case where only the slurry agitation is performed without performing the slurry circulation, the pile of slime cannot be sufficiently eliminated, and thus it is difficult to increase the leaching rate.

The slurry circulation may be performed from the beginning of the leaching. However, since the effect of the slurry circulation is low due to a lot of unreacted portions at the beginning of the leaching, the slurry circulation is preferably performed during the course of the oxidation leaching. In general, as the oxidation leaching proceeds, the oxidation-reduction potential of the slurry increases. For example, until the leaching rate increases up to about 70% (ORP: about 650 mV), the oxidation-reduction potential rapidly increases; the oxidation-reduction potential gradually increases when the leaching rate is about 80% to 90% (ORP: about 850 mV to 900 mV); and the oxidation-reduction potential is almost constant when the leaching rate is 95% or higher (ORP: about 950 mV to 1,000 mV).

The slurry circulation is preferably performed in a case where the oxidation-reduction potential of the slurry is 650 mV to 950 mV. For example, an oxidant may be added by a fixed amount each time to the slurry in the presence of a hydrochloric acid, the slurry circulation may be started when the oxidation-reduction potential of the slurry is higher than 650 mV, and the slurry circulation may be terminated when the oxidation-reduction potential reaches 950 mV. The slurry circulation is more preferably performed in a case where the oxidation-reduction potential is in a range of 800 mV to 900 mV.

Regarding the range of the oxidation-reduction potential, since the oxidation leaching sufficiently proceeds, the slurry is extracted from the tank bottom and circulated to prevent a pile of slurry from being formed, and even in a case where gold and the like are incorporated into aggregating portions of the slurry, the slurry is supplied again into the tank from the upper portion of the tank, the aggregating portions are deagglomerated by agitation. Thus, the gold and the like are exposed and the oxidation leaching is promoted.

The slurry circulation amount is preferably 1 to 10 mass % of a total slurry amount per hour. In a case where the circulation amount is smaller than 1 mass %, a long period of time is required for circulation of the whole amount, and in a case where the circulation amount is larger than 10 mass %, a burden of liquid feeding increases. The slurry circulation amount is more preferably 5 to 10 mass % of the total slurry amount per hour.

The liquid temperature of the slurry during the oxidation leaching is preferably about 70° C. to 80° C. In a case where the liquid temperature is lower than 70° C., the leaching reaction is difficult to proceed, and in a case where the liquid temperature is higher than 80° C. and the hydrogen peroxide is used as an oxidant, a hydrogen peroxide may be thermally decomposed. The liquid temperature of the slurry is more preferably 70° C. to 75° C.

The liquid temperature of the slurry is measured using a thermometer installed in the leaching tank.

The liquid temperature of the slurry can be adjusted by a speed of addition of the oxidant.

In a case where the oxidation leaching of the slurry proceeds and the oxidation-reduction potential is nearly higher than 950 my, the slurry suspended darkly turns muddy. Accordingly, the slurry circulation is stopped and the oxidation leaching is terminated.

According to the leaching method of this embodiment, the leaching rate of precious metals such as gold is improved. Specifically, for example, a gold leaching rate is 89% when only the slurry agitation is performed in a state in which a pile of slime is formed, however, according to the leaching method of this embodiment, the gold leaching rate is improved to 95% or higher, and preferably improved to 97%.

The leaching method according to this embodiment is easily performed since no special additives are used. In addition, since the leaching method is for leaching of highly precious metals such as gold, large economic advantages are obtained even with a slight improvement in leaching rate.

EXAMPLES

Examples of the invention will be shown below together with comparative examples. In the examples and the comparative examples, a metal concentration (gold concentration) was measured using ICP-AES. The oxidation-reduction potential is based on (Ag/AgCl). Table 1 shows results of the examples and the comparative examples.

Example 1

390 mL of a hydrochloric acid and 170 mL of water were added to 380 g of decopperized anode slime to obtain a slurry with a slurry concentration of 425 g/L and a free chlorine concentration of 3 mol/L. The liquid temperature of this slurry was maintained to 70° C. to 80° C. and the slurry was agitated (number of rotations: 150 rpm) 240 mL of a hydrogen peroxide was added little by little to the slurry while the oxidation-reduction potential was measured. When the potential reached 800 mV, 10 mass % of the slurry was extracted per hour from a tank bottom to start slurry circulation, and when the potential reached 950 mV, the addition of the hydrogen peroxide was stopped and the slurry circulation was stopped to terminate the leaching. The slurry after the leaching was subjected to solid-liquid separation, and a gold concentration (concentration in liquid) in the liquid component was measured. In addition, a solid content was washed with a hydrochloric acid, and a concentration (residual concentration) of gold remaining in the solid content was measured to obtain a leaching rate of gold using a formula to be described later. The gold leaching rate was 97%.

Examples 2 to 4

Hydrochloric acid oxidation leaching of a slurry of decopperized anode slime was carried out in the same manner as in Example 1, except that a solid component concentration and a chlorine concentration of the slurry, an oxidation-reduction potential at the time of starting the slurry circulation, an oxidation-reduction potential at the time of stopping the slurry circulation, and a circulation amount of the slurry circulation were as shown in Table 1.

Comparative Example 1

A slurry of decopperized anode slime which was similar to that of Example 1 was prepared. The liquid temperature of this slurry was maintained at 70° C. to 80° C. and the slurry was agitated (number of revolutions: 150 rpm). 240 mL of a hydrogen peroxide was added little by little to the slurry while the oxidation-reduction potential was measured. When the oxidation-reduction potential reached 950 mV, the addition of the hydrogen peroxide was stopped to terminate the leaching. The slurry after the leaching was subjected to solid-liquid separation, and a gold concentration of the liquid component was measured. In addition, a solid content was washed with a hydrochloric acid, and a concentration of remaining gold was measured to obtain a leaching rate of gold. The gold leaching rate was 89%.

TABLE 1

|  | Example 1 | Example 2 | Example 3 | Example 4 | Comparative Example 1 |
|---|---|---|---|---|---|
| Slurry | | | | | |
| Solid component concentration (g/L) | 425 | 425 | 500 | 350 | 425 |
| Chlorine Concentration (mol/L) | 3 | 3 | 4 | 2 | 3 |
| Liquid Temperature (° C.) | 70~80 | 70~80 | 70~80 | 70~80 | 70~80 |
| Rotations Speed of Agitation (rpm) | 150 | 150 | 150 | 150 | 150 |
| Oxidation-Reduction Potential (mV) | | | | | |
| When Circulation is Started | 800 | 650 | 800 | 800 | — |
| When Circulation is Stopped | 950 | 950 | 950 | 950 | — |
| Circulation Amount (mass %/hour) | 10 | 10 | 1 | 5 | — |
| Gold Leaching Rate (%) | 97 | 97 | 95 | 95 | 89 |

(Note)
The slurry is a slurry obtained by a hydrochloric acid and water to decopperized anode slime.
The circulation amount is a ratio with respect to a total amount.
The gold leaching rate is expressed by (concentration in liquid)/(concentration in liquid + residual concentration).

In a case where Examples 1 to 4 in which the slurry circulation was performed with the slurry agitation was compared with Comparative Example 1 in which only the slurry agitation was performed, it was found that the gold leaching rate was improved in Examples 1 to 4.

INDUSTRIAL APPLICABILITY

According to the method of the invention, it is possible to improve a leaching rate of precious metals in a method of carrying out hydrochloric acid oxidation leaching of the precious metals contained in decopperized anode slime.

REFERENCE SIGNS LIST

10: LEACHING TANK
11: SUPPLY TUBE
12: ADDITION DEVICE
13: AGITATION DEVICE
14: ELECTROMETER
15: CIRCULATION PATH
16: SLURRY
17: LIQUID FEEDING PUMP

The invention claimed is:

1. A method of carrying out hydrochloric acid oxidation leaching of a precious metal contained in decopperized anode slime, comprising:
adding a hydrochloric acid and an oxidant to a slurry of the decopperized anode slime; and
agitating and circulating the slurry at the same time,
wherein, in the circulating, the slurry is extracted from a lower portion of a tank and supplied again into an upper portion of the tank, and
wherein the slurry is circulated in a case where an oxidation-reduction potential of the slurry is 650 mV to 950 mV.

2. The method of carrying out hydrochloric acid oxidation leaching of a precious metal contained in decopperized anode slime, according to claim 1,
wherein the oxidant is added by a fixed amount each time to the slurry of decopperized anode slime in the presence of a hydrochloric acid, such that the circulating is started when the oxidation-reduction potential of the slurry is higher than 650 mV, and the circulating is terminated when the oxidation-reduction potential of the slurry reaches 950 mV.

3. The method of carrying out hydrochloric acid oxidation leaching of a precious metal contained in decopperized anode slime, according to claim 1, wherein 1 to 10 mass % of the slurry with respect to a total amount of the slurry is extracted per hour to circulate the slurry.

4. The method of carrying out hydrochloric acid oxidation leaching of a precious metal contained in decopperized anode slime, according to claim 1, wherein the hydrochloric acid oxidation leaching is performed in a case where a solid component concentration is 350 to 500 g/L and a chlorine concentration is 2 to 4 mol/L in the slurry.

5. The method of carrying out hydrochloric acid oxidation leaching of a precious metal contained in decopperized anode slime, according to claim 1,
wherein the hydrochloric acid oxidation leaching is performed at a liquid temperature of 70° C. to 80° C.

* * * * *